(12) United States Patent
Nicodemus et al.

(10) Patent No.: US 10,113,587 B1
(45) Date of Patent: Oct. 30, 2018

(54) TURBOCHARGER THRUST BEARING

(71) Applicant: GM GLOBAL TECHNOLOGY OPERATIONS LLC, Detroit, MI (US)

(72) Inventors: Rajasekhar Nicodemus, Bengaluru (IN); Fanghui Shi, Bloomfield Hills, MI (US); Sudipto Ray, Seegehalli (IN); Dingfeng Deng, Auburn Hills, MI (US); Louis Begin, Rochester, MI (US); Ran Wu, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/683,275

(22) Filed: Aug. 22, 2017

(51) Int. Cl.
*F16C 33/10* (2006.01)

(52) U.S. Cl.
CPC ........ *F16C 33/108* (2013.01); *F16C 33/1045* (2013.01); *F16C 33/1065* (2013.01); *F16C 2300/40* (2013.01); *F16C 2360/24* (2013.01)

(58) Field of Classification Search
CPC .. F16C 17/042; F16C 17/065; F16C 33/1045; F16C 33/1055; F16C 33/1065; F16C 33/108; F16C 2360/24
See application file for complete search history.

(56) References Cited

U.S. PATENT DOCUMENTS

| | | | | |
|---|---|---|---|---|
| 5,178,471 A | * | 1/1993 | Roessler | F01D 25/168 384/369 |
| 7,401,980 B2 | * | 7/2008 | Krauss | F01D 25/168 384/112 |
| 8,240,921 B2 | * | 8/2012 | Boning | F01D 25/168 384/112 |
| 9,447,819 B2 | * | 9/2016 | Dehne | F16C 17/18 |
| 2016/0319744 A1 | | 11/2016 | Deng et al. | |

FOREIGN PATENT DOCUMENTS

| | | | | |
|---|---|---|---|---|
| JP | 06066150 A | * | 3/1994 | ............ F16C 17/047 |
| JP | 2002349551 A | * | 12/2002 | ............ F16C 17/047 |
| JP | 2005315113 A | * | 11/2005 | ............ F16C 17/047 |

* cited by examiner

*Primary Examiner* — Phillip A Johnson (57) ABSTRACT

An improved thrust bearing for a turbocharger includes a first bearing surface, a second bearing surface, an internal passageway, a primary pad, and a plurality of secondary pads. The internal passageway fluidly connects the first and second bearing surfaces. The primary pad may be defined on the first bearing surface. The primary pad further defines a first aperture in fluid communication with the internal passageway and an oil feed defined in a turbocharger housing. The plurality of secondary pads may also be defined on the first bearing surface. Each secondary pad in the plurality of secondary pads may include a secondary surface area which is smaller than the primary surface area of the primary pad.

11 Claims, 7 Drawing Sheets

TURBOCHARGER THRUST BEARING

TECHNICAL FIELD

The present disclosure relates to a turbocharged internal combustion engine and more particularly, to an improved thrust bearing design for improved lubrication.

BACKGROUND

Internal combustion engines are used to generate considerable levels of power for prolonged periods of time on a dependable basis. Many such engine assemblies employ a supercharging device, such as an exhaust gas turbine driven turbocharger, to compress the airflow before it enters the intake manifold of the engine in order to increase power and efficiency.

Specifically, a turbocharger utilizes a centrifugal gas compressor that forces more air and, thus, more oxygen into the combustion chambers of the engine than is otherwise achievable with ambient atmospheric pressure. The additional mass of oxygen-containing air that is forced into the engine improves the engine's volumetric efficiency, allowing it to burn more fuel in a given cycle, and thereby produce more power.

A typical turbocharger en ploys a central shaft that is supported by one or more bearings and transmits rotational motion between an exhaust-driven turbine wheel and an air compressor wheel. Both the turbine and compressor wheels are fixed to the shaft, which in combination with various bearing components constitute the turbocharger's rotating assembly. It is important to maintain lubrication of the turbocharger thrust bearing.

Figure 3:
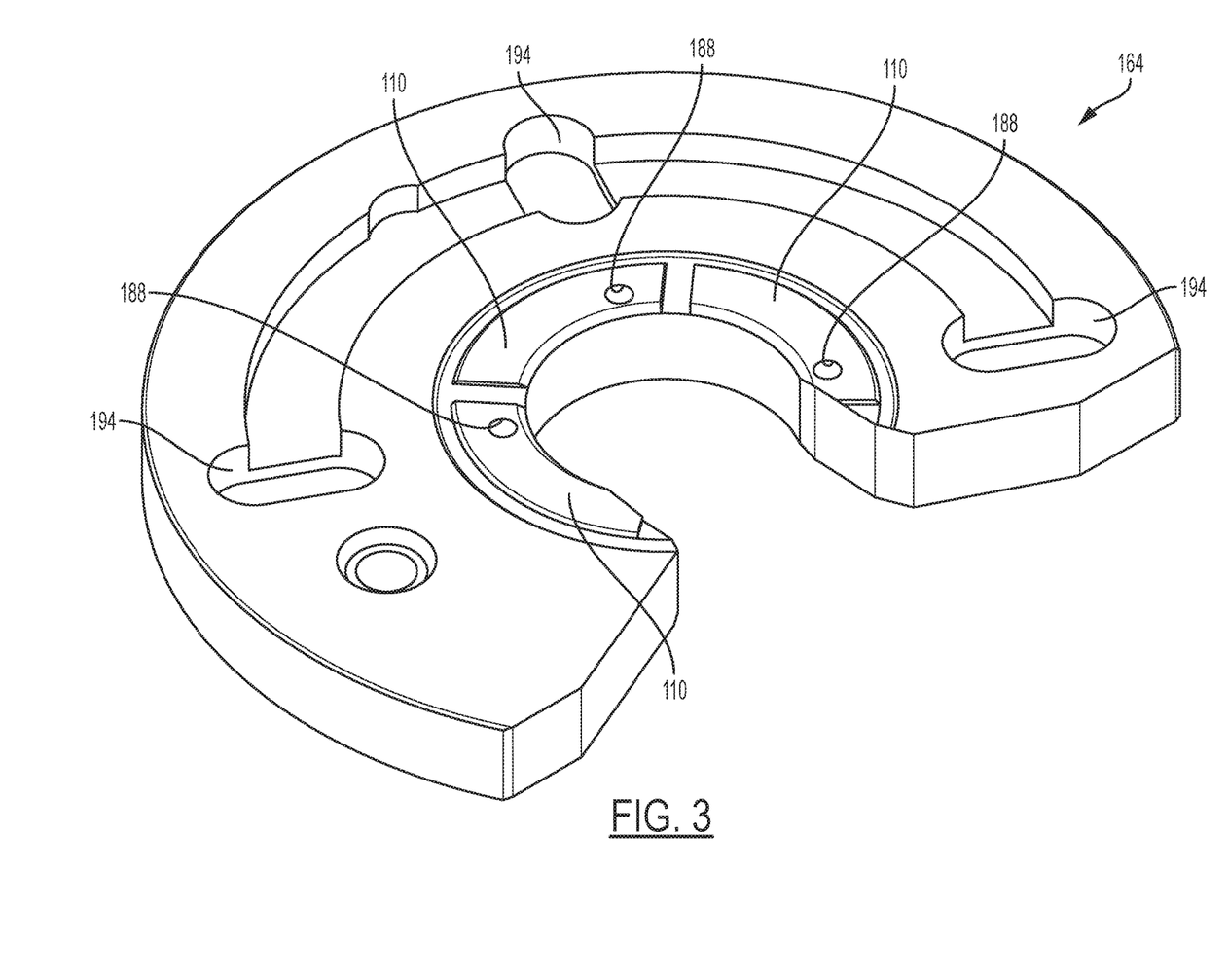
FIG. 3 is an isometric view of a traditional thrust bearing.

With reference to FIG. 3, a traditional thrust bearing 164 for a turbocharger is shown having pads 110 with equivalent surface areas. Each pad 110 is in fluid communication with oil feed groove 194 via internal passageway 188. However, the traditional thrust bearing 164 under a cold operating condition fails to distribute oil to the pads 110 due to the high viscosity of the oil (and low volume of oil flow The poor distribution oil may create a risk of seizure during a cold operation and unnecessarily high power losses during a hot operation. Accordingly, there is a need for an improved turbocharger assembly and a thrust bearing which reduces power losses and improves efficiency.

SUMMARY

The present disclosure provides for an improved thrust bearing for a turbocharger includes a first bearing surface, a second bearing surface, an internal passageway, a primary pad, and a plurality of secondary pads. The internal passageway fluidly coupling the first and second bearing surfaces to an oil feed groove defined on the first bearing surface. The primary pad may be defined on the first surface. The internal passageway terminates at the first bearing surface via a first aperture which is in fluid communication with the second bearing surface, the oil feed groove, and an oil feed defined in a turbocharger housing. The plurality of secondary pads may be also defined on the first surface. It is understood that each secondary pad in the plurality of secondary pads may have a secondary surface area which is smaller than the primary surface area of the primary pad.

The present disclosure also provides for an improved turbocharger assembly which includes a turbocharger housing; a rotary assembly, and a thrust bearing. The rotary assembly includes a turbine wheel and a compressor wheel attached to one another by a shaft. The rotary assembly may also include a thrust surface. The thrust bearing may be disposed in the turbocharger housing for opposing the thrust surface of the rotary assembly. The thrust bearing may also define a shaft aperture there through for receiving the shaft. The thrust bearing may also define a primary pad and a plurality of secondary pads. Each of the secondary pad and the primary pad may define a land region being perpendicular to the rotational axis of the shaft and a slope region. It is also understood that the thrust bearing may further define a first bearing surface and a second bearing surface. The primary pad includes a primary surface area which is greater than a secondary surface area of each secondary pad in the plurality of secondary pads. The primary pad is operatively configured to engage with the thrust surface during both cold and hot turbocharger operations. Whereas, the plurality of secondary pads are configured to engage with the thrust surface during hot turbocharger operations.

It is further understood that the improved turbocharger assembly further provides for an oil feed which defined the housing. The oil feed may be in fluid communication with the primary pad via an internal passageway defined in the thrust bearing. Moreover, an oil feed groove may be defined on the thrust bearing such that the oil feed groove is in fluid communication with the primary pad defined on the first bearing surface, the second bearing surface, and the oil feed defined in the housing via the internal passageway.

In both the improved turbocharger assembly as well as the thrust bearing of the present disclosure, the first bearing surface may define the primary pad and the plurality of secondary pads in addition to an oil feed groove. Moreover, the secondary surface area for each secondary pad are substantially equivalent to one another—with respect to the thrust bearing and the turbocharger assembly. Moreover, the thrust bearing may include a partial arced groove defined on the first bearing surface wherein the partial arced groove is adjacent only to the plurality of secondary pads. The partial arced groove is configured to reduce the surface area of each secondary pad relative to the primary pad.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of" and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 1:
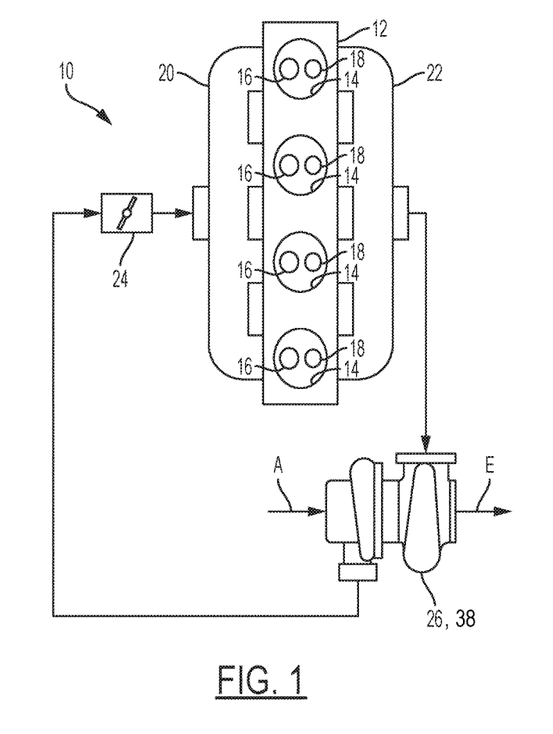
FIG. 1 is a schematic illustration of an engine assembly according to the present disclosure.

An engine assembly 10 is illustrated in FIG. 1 and may include an engine structure 12 defining a plurality of cylinders 14 and intake and exhaust ports 16, 18 in communication with the cylinders 14. An intake manifold 20 is in communication with the intake ports and an exhaust manifold 22 is in communication with the exhaust ports 18. A throttle valve 24 and a turbocharger 26 are provided in an intake passage that is connected to the intake manifold 20 and the turbocharger 26 is also in communication with an exhaust passage connected to the exhaust manifold 22. The engine assembly 10 is illustrated as an in-line four cylinder arrangement for simplicity. However, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

Figure 2:
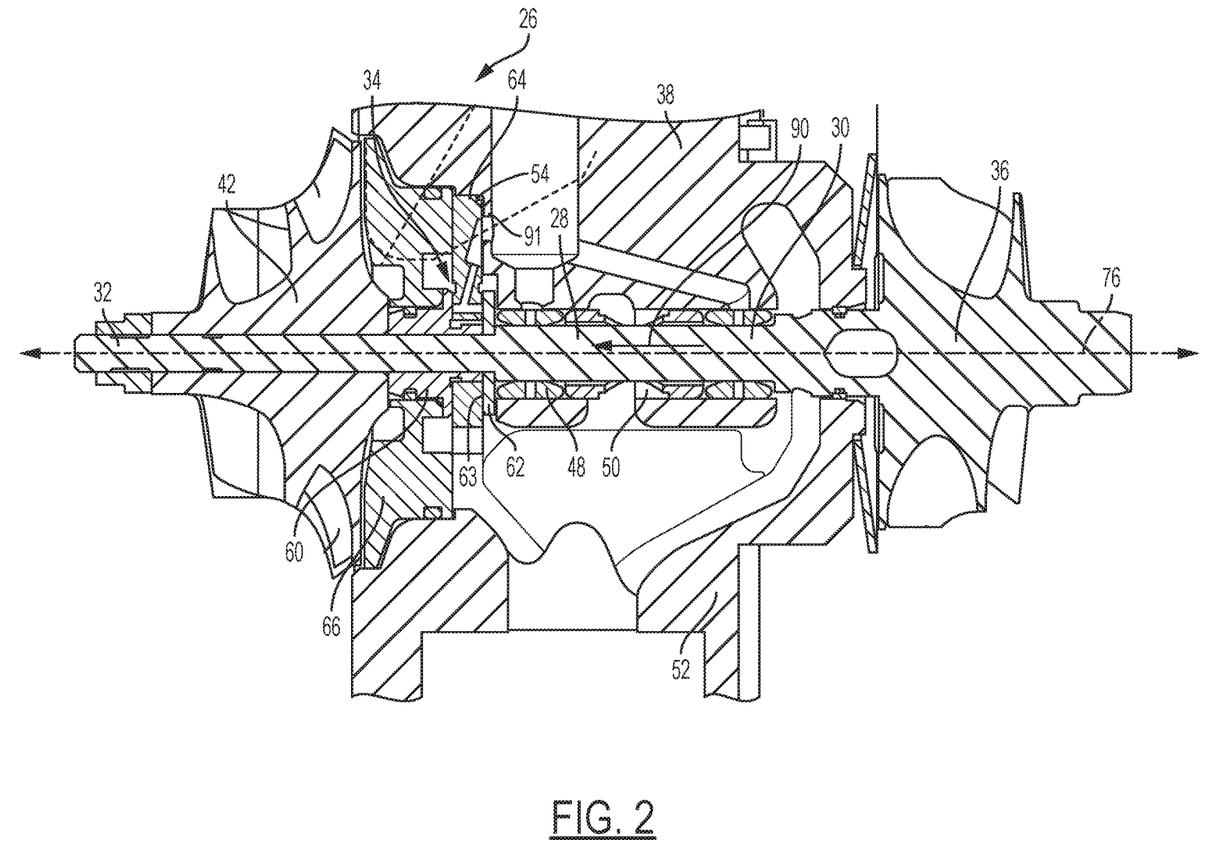
FIG. 2 is a schematic cross-sectional illustration of the turbocharger shown in FIG. 1.

As shown in FIG. 2, the turbocharger 26 includes a shaft 28 having a first end 30 and a second end 32. A turbine wheel 36 is mounted on the shaft 28 proximate to the first end 30 and configured to be rotated by combustion exhaust gasses emitted from the cylinders 14. The turbine wheel 36 is typically formed from a temperature and oxidation resistant material, such as a nickel-chromium-based "inconel" superalloy to reliably withstand temperatures of the combustion exhaust gasses which in some engines may approach 2,000 degrees Fahrenheit. The turbine wheel 36 is disposed inside a turbine housing that includes a volute or scroll. The scroll receives the combustion exhaust gases and directs the exhaust gases to the turbine wheel 36.

As further shown in FIG. 2, the turbocharger 26 also includes a compressor wheel 42 mounted on the shaft 28 proximate to the second end 32. The compressor wheel 42 is configured to pressurize the airflow being received from the ambient for eventual delivery to the cylinders 14. The compressor wheel 42 is disposed inside a compressor cover that includes a volute or scroll. The scroll receives the airflow and directs the airflow to the compressor wheel 42. Accordingly, rotation is imparted to the shaft 28 by the combustion exhaust gases energizing the turbine wheel 36, and is in turn communicated to the compressor wheel 42.

With continued reference to FIG. 2, the shaft 28 is supported for rotation via a journal bearing 48. The journal bearing 48 is mounted in a bore 50 of a bearing housing 52 and is lubricated and cooled by a supply of pressurized engine oil. The bearing housing 52 includes a thrust wall 54. The journal bearing 48 is configured to control radial motion and vibrations of the shaft 28. As shown, the turbocharger 26 also includes a thrust bearing 64 that is held in place by a compressor backplate 66 against the bearing wall 54. As indicated, there is a poor distribution oil wherein there is a risk of seizure during a cold operation and unnecessarily high power losses during a hot operation. Therefore, the present disclosure provides a thrust bearing having a larger pad area (primary pad) to support thrust load to avoid seizure at cold operating condition while simultaneously reducing power losses at normal hot operating conditions.

The thrust bearing 64 of the present disclosure is configured to counteract the net thrust force 90 developed within the turbocharger 26, when such a force is acting towards the compressor wheel 42. As shown, the thrust bearing 64 is positioned on the shaft 28, between the journal bearing 48 and the compressor wheel 42. The bearing 64 is lubricated and cooled by the supply of pressurized engine oil 98 (schematically shown in FIG. 4) supplied via a pump (not shown). It is understood that engine oil 98 is fed from the oil feed 91 to the thrust bearing 64 via oil feed groove 94 (FIGS. 4 and 7) and internal passageway 92. (See FIG. 7). During operation of the turbocharger 26, i.e., when the turbine wheel 36 is energized by the combustion exhaust gases, thrust forces 90 developed by the turbine wheel are generally transmitted by a thrust surface 63 (FIG. 2) to the thrust bearing 64. In the example shown in FIG. 2, the thrust surface 63 is defined on the thrust washer 62 which is adjacent to the thrust bearing 64. The thrust surface 63 may be defined on other components adjacent to the thrust bearing 64 dependent on the configuration of the turbocharger 26.

Figure 4:
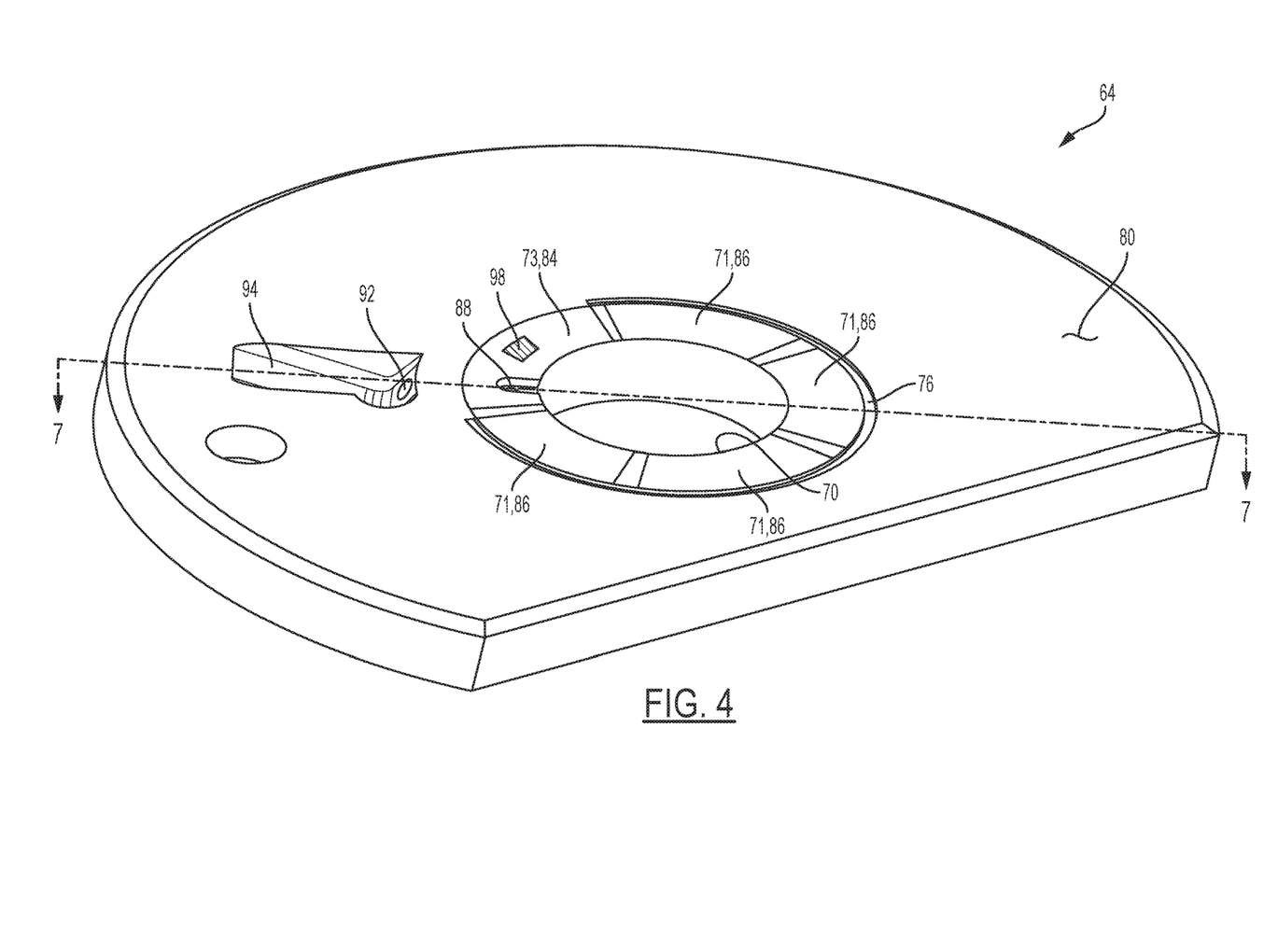
FIG. 4 is an example, non-limiting isometric view of an embodiment of a thrust bearing of the present disclosure
Figure 5:
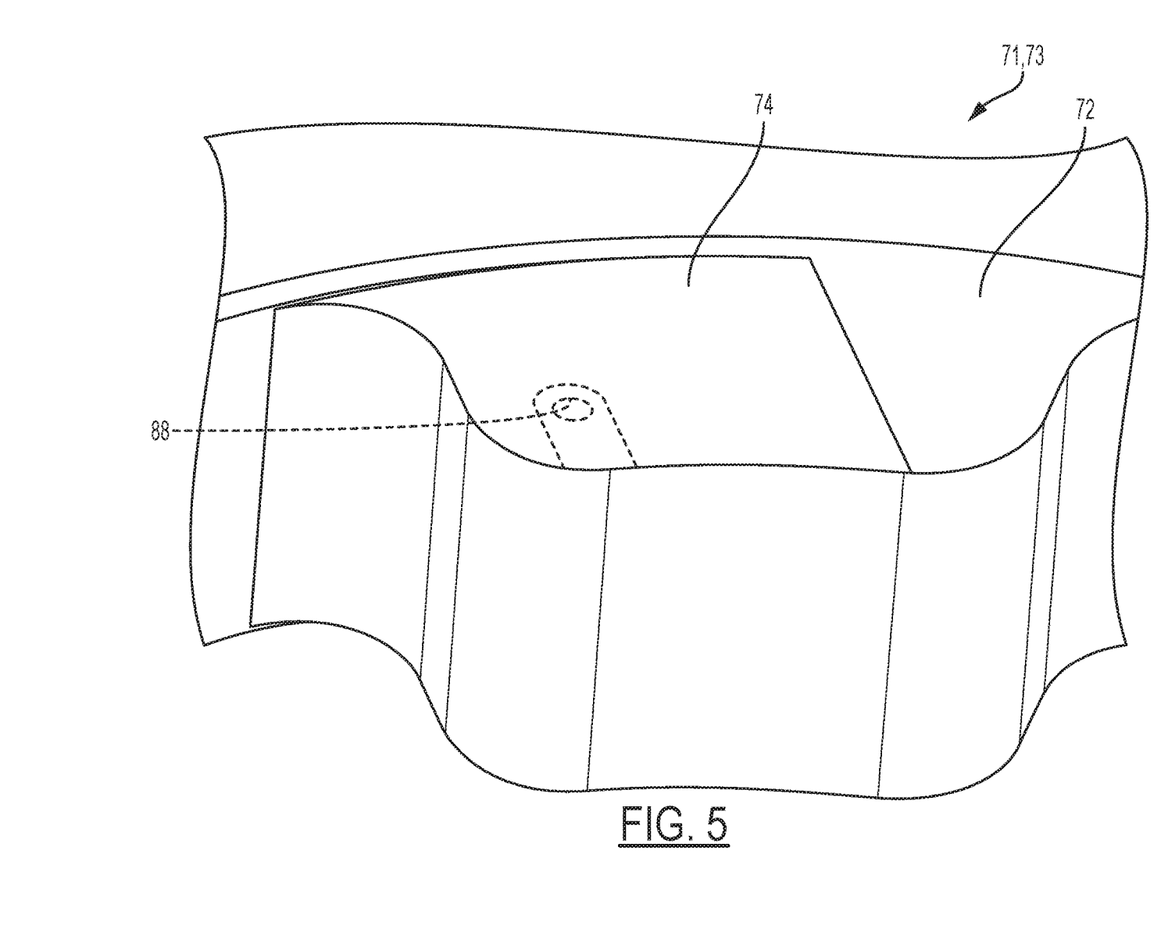
FIG. 5 is an enlarged, schematic view of a pad which may represent a primary pad or a secondary pad.
Figure 6:
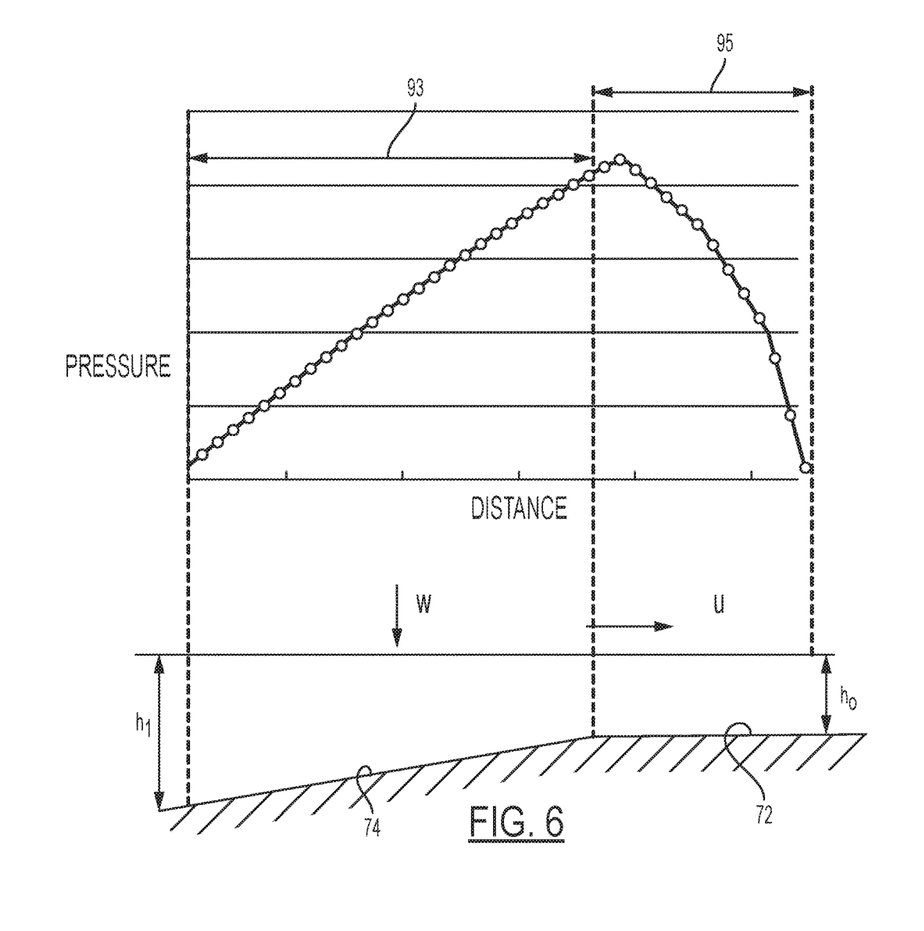
FIG. 6 is a pressure graph which is aligned to the profile of the primary pad.

With reference to FIG. 4, an example thrust bearing 64 of the present disclosure is shown which includes a shaft aperture 70 extending there through for receiving the shaft 28 (shown in FIG. 2), a plurality of secondary pads 71, and a primary pad 73 (circumferentially spaced) that may be engaged by a thrust surface 63 along the shaft 28 as described herein. With reference to FIG. 5, it is understood that the secondary pads 71 and the primary pad 73 may each include a slope region 74 and a land region 72. The land region 72 may be generally perpendicular to the rotational axis 76 (FIG. 2) of the shaft 28 (FIG. 2). As shown in FIG. 5, a slope region 74 is adjacent to a land region 72 for the primary pad 73 as well as each of the secondary pads 71. Each land region 72 and slope region 74 is designed so that the slope region 74 may take up more lubricant oil 98 from the oil feed 91 wherein such oil flows to the land region 72 for each pad in order to reduce friction. As shown in FIG. 6, a typical profile of oil pressure 93 is shown in FIG. 6. It is understood that in FIG. 6, hi is the distance between the slope region 74 and the thrust surface 63 while ho is the distance between the land region 72 and the thrust surface 63. W is the thrust force 90 while u is the rotational velocity component of the rotary assembly.

During cold operations where turbocharger temperature may fall in the range of –40 degrees Celsius to –25 degrees Celsius, the oil viscosity is relatively high and the volume of oil flowing in the turbocharger 26 is therefore relatively low. Accordingly, oil flow in a cold operation substantially loads the primary pad 73 with little to no oil flowing to the secondary pads 71. It is understood that the primary pad 73 defines a primary surface area 84 which is greater than a secondary surface area 86 of each secondary pad 71—given that the primary pad 73 is configured to counteract the thrust force 90 during cold operations—without the aid of the secondary pads 71. The relatively larger surface area provided in the primary surface area 84 in the primary pad 73 is therefore configured to accommodate relatively more oil compared to each of the secondary pads 71.

However, when the turbocharger temperature is high and the turbocharger 26 is in a hot operation at a temperature which may fall in the range of 140 degrees Celsius to 180 degrees Celsius, then oil viscosity is relatively low and the volume of oil flow in the turbocharger 26 is relatively high compared to a cold operation. Accordingly, the primary pad's 73 capacity to accept the flow of oil 98 (by itself) is exhausted in light of the increased volume of oil 98 flowing onto and past the primary pad 73—when viscosity is low and both oil volume and oil temperature are high. This condition causes oil 98 to then flow onto the secondary pads 71 after it passes over the primary pad 73. The secondary pads 71 are operatively configured to counteract the thrust force (together with the primary pad 73) when the turbocharger 26 is in hot operation.

Accordingly, the configuration of the turbocharger assembly 26 having the aforementioned thrust bearing 64 provides for improved efficiency in the turbocharger 26 such that the primary pad 73 substantially operates to counteract the thrust force 90 with the engine oil 98 in cold operation, and in hot operation, the plurality of the secondary pads 71 together with the primary pad 73 are configured to engage with the thrust surface 63 to counteract the thrust force 90 with the engine oil in a hot operation—as the engine assembly 10 and turbocharger 26 heats up. The primary and secondary pads (73 and 71 respectively) are therefore configured to reduce the power losses in both hot and cold operations.

Therefore, with reference back to FIG. 2, an improved turbocharger assembly 26 of the present disclosure may include a turbocharger housing 38, a rotary assembly 34, and a thrust bearing 64. The rotary assembly 34 may include a turbine wheel 36 and a compressor wheel 42 attached to one another by a shaft 28. The rotary assembly 34 may also include a thrust surface 63. The thrust bearing 64 may be disposed in the turbocharger housing 38 for opposing the thrust surface 63 of the rotary assembly 34. The thrust bearing 64 may define a shaft aperture 70 there through for receiving the shaft 28 and may define a primary pad 73 and a plurality of secondary pads 71 that each define a land region 72 being perpendicular to the rotational axis 76 of the shaft 28 and a slope region 74, the thrust bearing 64 further defining a first bearing surface 80 and a second bearing surface 82. The primary pad 73 may define a primary surface area 84 which is greater than a secondary surface area 86 of each secondary pad 71 in the plurality of secondary pads 71.

Figure 7:
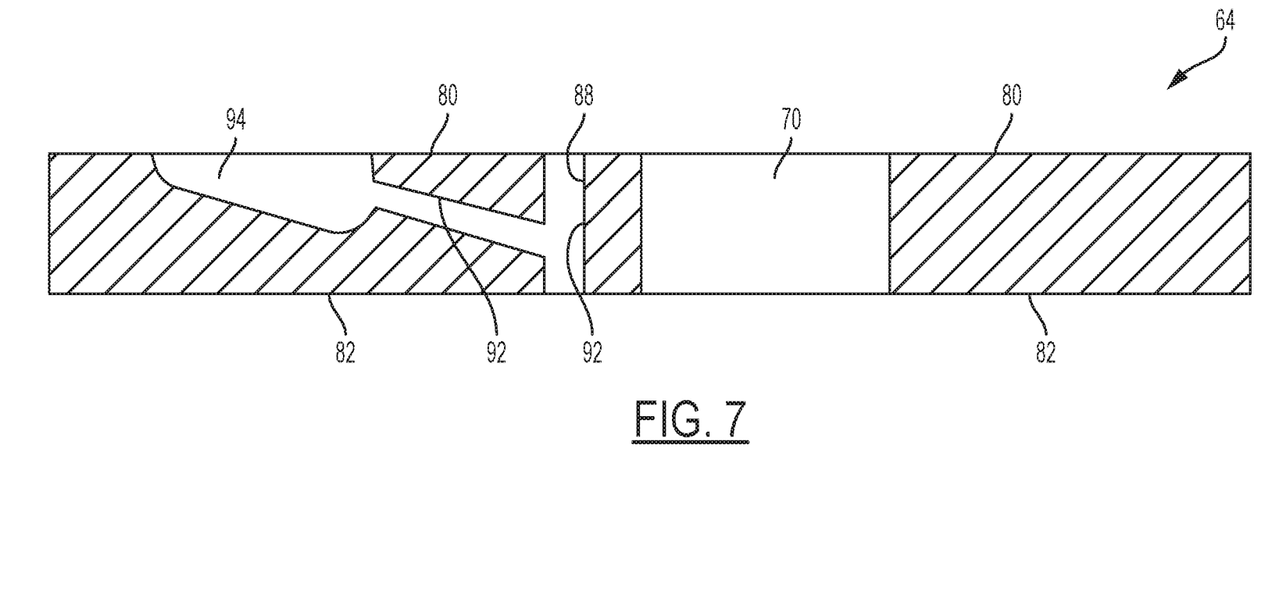
FIG. 7 is a cross-sectional view of the thrust bearing of FIG. 4 along line 7-7.

In both the improved turbocharger assembly 26 of the present disclosure as well as the thrust bearing 64 of the present disclosure, the first bearing surface 80 may define the primary pad 71 and the plurality of secondary pads 71 in addition to an oil feed groove 94. The oil feed groove 94 is in fluid communication with the primary pad 73 via internal passageway 92 as shown in FIG. 7. Additionally, the thrust bearing 64 may include a partial arced groove 76 defined on the first bearing surface 80 wherein the partial arced groove 76 is adjacent only to the plurality of secondary pads 71 as shown in FIG. 4. The partial arced groove 76 may be configured to reduce the secondary surface area 86 of each secondary pad 71 relative to the primary pad 73.

While at least one exemplary embodiment has been presented in the foregoing detailed description, it should be appreciated that a vast number of variations may exist. It should also be appreciated that the exemplary embodiment or exemplary embodiments are only examples, and are not intended to limit the scope, applicability, or configuration of the disclosure in any way. Rather, the convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. An improved turbocharger assembly comprising:
a turbocharger housing;
a rotary assembly including a turbine and a compressor attached to one another by a shaft, said rotary assembly including a thrust surface; and a thrust bearing disposed in the housing for opposing the thrust surface of the rotary assembly, said thrust bearing having a shaft aperture there through for receiving the shaft and defining a primary pad and a plurality of secondary pads that each define a land region being perpendicular to the rotational axis of the shaft and a slope region, the thrust bearing further defining a first bearing surface and a second bearing surface;

wherein the primary pad defines a primary surface area which is greater than a secondary surface area of each secondary pad in the plurality of secondary pads.

2. The improved turbocharger assembly as defined in claim 1 further comprising an oil feed defined the housing, the oil feed being in fluid communication with the primary pad via an internal passageway defined in the thrust bearing.

3. The improved turbocharger assembly as defined in claim 2 wherein the secondary surface area for each secondary pad are substantially equivalent to one another.

4. The improved turbocharger assembly as defined in claim 3 wherein the first bearing surface defines the primary pad and the plurality of secondary pads in addition to an oil feed groove.

5. The improved turbocharger assembly as defined in claim 4 wherein the oil feed groove is in fluid communication with the primary pad defined on the first bearing surface, the second bearing surface, and the oil feed defined in the housing via the internal passageway.

6. The improved turbocharger assembly as defined in claim 5 further comprising a partial arced groove defined on the first bearing surface, the partial arced groove being defined adjacent to the plurality of secondary pads.

7. An improved thrust bearing for a turbocharger comprising:

a first bearing surface and a second bearing surface;

an internal passageway connecting the first and second bearing surfaces;

a primary pad defined on the first surface, the primary pad further defining a first aperture in fluid communication with an internal passageway; and a plurality of secondary pads defined on the first bearing surface, each secondary pad in the plurality of secondary pads having a secondary surface area which is smaller than the primary surface area of the primary pad.

8. The improved thrust bearing as defined in claim 7 wherein the primary pad and each secondary pad in the plurality of secondary pads each define a land region being perpendicular to the rotational axis of the shaft.

9. The improved thrust bearing as defined in claim 8 wherein the primary pad is in fluid communication with an oil feed in a turbocharger housing and the second bearing surface via the internal passageway.

10. The improved thrust bearing as defined in claim 9 wherein the secondary surface area for each secondary pad are substantially equivalent to one another.

11. The improved thrust bearing as defined in claim 10 wherein the first bearing surface defines the primary pad and the plurality of secondary pads in addition to an oil feed groove.

* * * * *